United States Patent [19]

Brandon

[11] 4,436,311
[45] Mar. 13, 1984

[54] SEGMENTED LABYRINTH-TYPE SHAFT SEALING SYSTEM FOR FLUID TURBINES

[76] Inventor: Ronald E. Brandon, 1734 Lenox Rd., Schenectady, N.Y. 12308

[21] Appl. No.: 370,093

[22] Filed: Apr. 20, 1982

[51] Int. Cl.³ .............................................. F16J 15/44
[52] U.S. Cl. ...................................... 277/27; 277/53; 277/56; 277/192
[58] Field of Search ............................ 277/26, 53–57, 277/192, 199, 3, 27

[56] References Cited

U.S. PATENT DOCUMENTS

| | | | |
|---|---|---|---|
| 967,247 | 8/1910 | Samuelson | 277/53 X |
| 2,239,637 | 4/1941 | Zesewitz | 277/56 |
| 2,600,991 | 6/1952 | Hargrove | 277/56 X |

FOREIGN PATENT DOCUMENTS

| | | | |
|---|---|---|---|
| 28259 | 10/1924 | France | 277/53 |
| 763708 | 2/1934 | France | 277/56 |
| 128449 | 6/1950 | Sweden | 277/56 |
| 387069 | 4/1965 | Switzerland | 277/27 |
| 1224234 | 3/1971 | United Kingdom | 277/55 |

*Primary Examiner*—Robert S. Ward
*Attorney, Agent, or Firm*—Philip Young

[57] ABSTRACT

Springs are arranged in elastic fluid turbine seal ring systems to accomplish a condition of relatively large clearance while starting and during low load conditions but in cooperation with pressure forces occurring at higher loads permitting said seal ring to relocate to a position of relatively small clearance to improve sustained efficiency.

7 Claims, 4 Drawing Figures

SEGMENTED LABYRINTH-TYPE SHAFT SEALING SYSTEM FOR FLUID TURBINES

This invention relates to seals found in elastic fluid axial flow turbines. Such seals are arranged both where rotatable shafts penetrate stationary turbine casings and, in addition, internal to the casings between stages and turbine sections. The seals prevent or reduce leakage of the fluid by creating small clearance areas with low flow coefficients between the rotating and stationary parts. Improved efficiency, minimized loss of fluid, and prevention of undesirable side effects caused by leakage of fluid are all planned benefits of such seals.

The seals are vulnerable to rubbing damage caused by turbine misalignment, vibration and thermal distortion. Most of these damage causing factors are more likely to occur during starting, at light loads or following sudden loss of load. As a result, it would be desirable to create a condition of relatively large clearance during these conditions, to minimize possible damage to the seals, yet still accomplish a small clearance condition at higher loads. The higher load condition corresponds to operation when efficiency is of highest value and where turbine operation is stable relative to most of the factors which can cause damage to seals.

It should be recognized that turbine designers already take significant steps to minimize leakage. The seals are made of materials specially selected to minimize damage caused by rubbing. The seal geometry is designed with thin teeth to require the least amount of heat and force during rubbing situations. The seal rings are usually spring-backed and allow rubbing forces to shift the rings to minimize rubbing forces and damage. The springs are arranged to push the seal rings toward the shaft, but not beyond a limiting position provided by shoulders located on the stationary parts.

Accordingly, one object of the present invention is to provide an arrangement that will cause the clearance of seals to be large during starting, shutdown or low load conditions, yet small during operation at medium to high loads.

Another object of the invention is to decrease the degradation of operating efficiency caused by seal damage.

Still another object of the invention is to decrease the cost of maintaining turbines due to the reduced necessity of replacing rubbed, damaged seals.

Yet another object of the invention is to permit smaller operating clearance with lower leakage flow coefficients than these now in use.

Briefly stated, the invention is practiced by providing springs that cause seals to be positioned at a large clearance position during starting or low load conditions. The spring forces are overcome, however, by pressure forces which develop with medium to high load conditions such that the seals are repositioned to a small clearance as load is increased.

For a better understanding of this invention, reference is made to the accompanying drawings in which.

Figure 1:
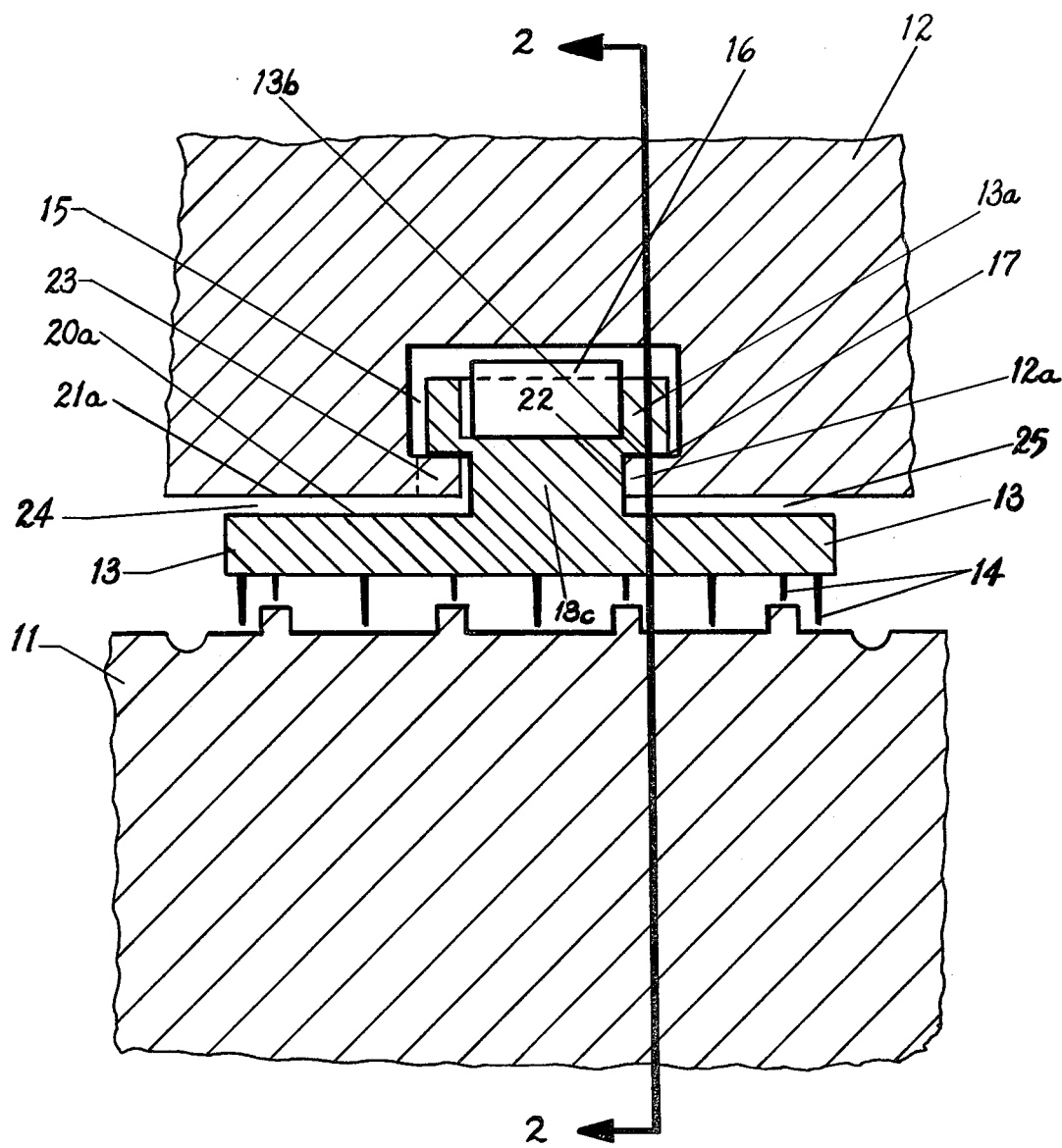
FIG. 1 is a horizontal elevation drawing, partly in section, of a multistage axial flow elastic turbine showing a portion of one stage with a shaft seal ring.

Referring to FIG. 1, the turbine includes a rotor, a portion of which is shown at 11, and a casing, a portion of which is shown at 12. With regard to interstage seals, it should be noted that part 12, the casing, could instead be called a diaphragm. Only one seal ring 13 is illustrated, although several such rings could be arranged in series. It will be understood by those skilled in the art that the remainder of the turbine necessarily includes means for introducing steam at high pressure and exhausting it at lower pressure, with nozzles, buckets, wheels and other components which do not need inclusion here to explain the seal function which is effected by the invention. The seal ring shown is typical of many found throughout the turbine.

The seal ring 13 includes a plurality of teeth 14 that are disposed in opposition to circumferential portions of the shaft which are alternately stepped up and down in radius. With high pressure fluid at 18 and low pressure at 19 there will be a positive force to cause fluid leakable between the multiple restrictions formed by the small openings between the teeth 14 and the shaft 11. The combination of the clearance area, the relative sharpness of the teeth, the number of the restrictions, the fluid conditions including pressure and density, and the geometry of the leakage path determine the amount of leakage flow according to formulae and empirical constants which are well known. Many other geometrical arrangements are also used to provide multiple or single leakage restrictions than the style illustrated.

Figure 2:
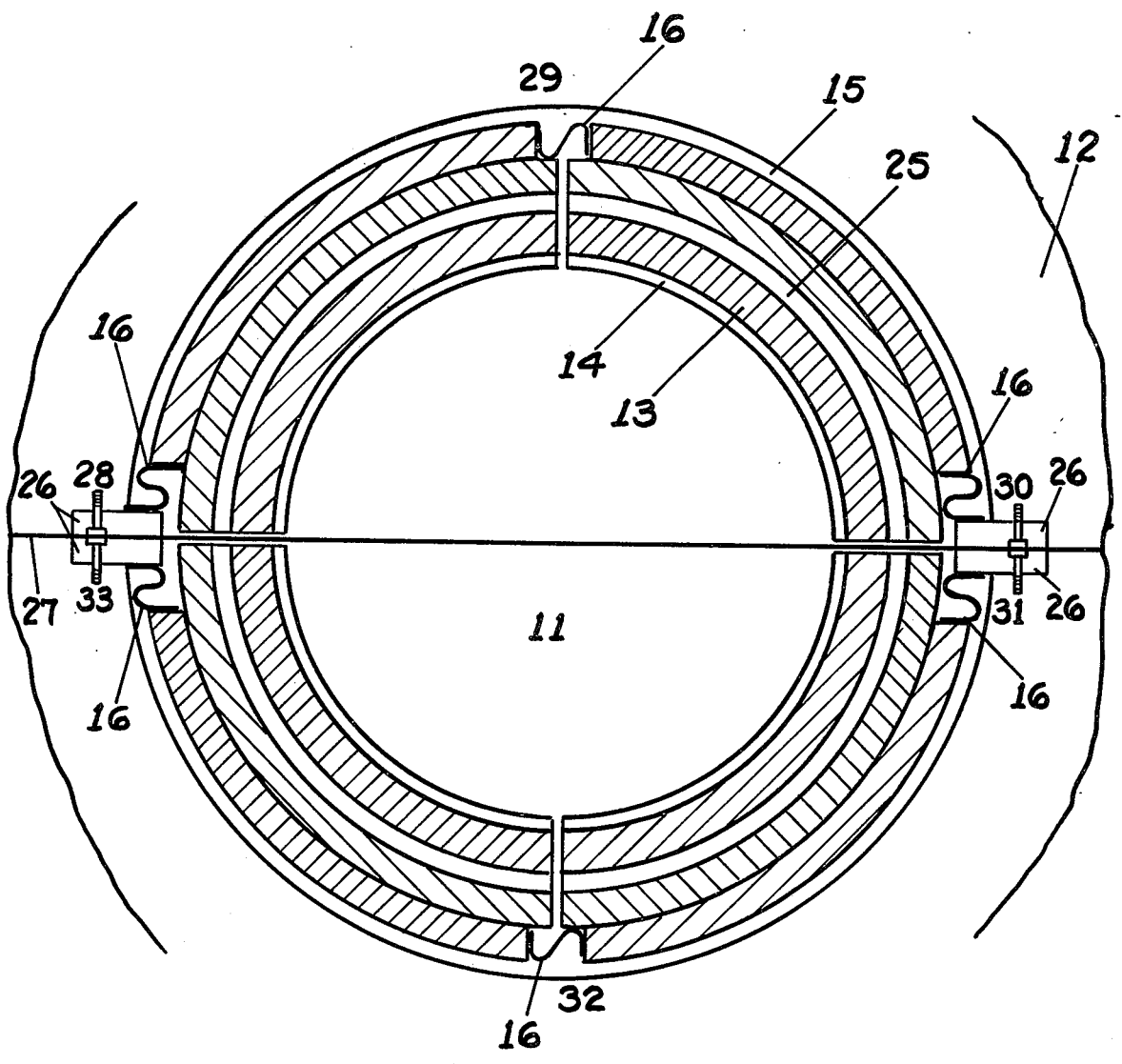
FIG. 2 is a cross-section view taken along lines 2—2 of FIG. 1.

The seal ring is retained in groove 15 of the casing 12. As shown in FIG. 2, the seal ring is comprised of four or more segments each disposed within the groove 15 to accommodate assembly or disassembly of the casing by locating the seal ring sections to separate at the joint 27 of the casing. Springs 16, are located at each end of each seal ring segment in a compressed condition. Positive circumferential location and retainment of the seal ring segments and springs 16 are assured by locking pieces 26 which are provided above and below casing joints 27. It is to be understood that while the words "seal ring 13" are used herein, they may apply to an individual seal ring segment and, therefore, should be read in the context of the sentence.

Each segment of the seal ring 13 is shown including the inner ring portion, indicated in FIG. 1 by numeral 13, having the seal teeth 14 extending from its radially inward surface while its radially outward surface 20a limits the large clearance position by means of its contact with the radial surface 21a of the casing 12. The seal ring 12 also includes an outer ring portion 13a disposed within the casing groove 15 with an inner circumferential surface 13b which, as described below, limits the small clearance position of the seal ring segments by restraining their radial inward movement by contact of surface 13b with surface 17 on the shoulder 12a of casing 12. The seal ring 13 shown in FIG. 1 also includes a neck portion 13c between said inner ring section and said outer ring section into which the shoulder 12a of the casing interlock to axially locate the ring segment. As described below seal ring neck portion 13c provides a contact pressure surface which, as shown at 22, is in direct contact with the casing shoulder 12a.

At low or no load conditions, only the weight of the seal ring segments, the confining limits of the casing, and the force of the springs 16 act on the seal rings. The springs are selected with sufficient strength and dimension under these conditions to cause the seal ring segments to separate at each segment joint. This causes the seal rings to seek larger diameters but limited to that available within the annular space 24 and 25. When this space is decreased to permit contact between surfaces 20a and 21a, no further enlargement can occur. The annular space is sized to allow, by the radially outward movement of the ring segments, sufficient space to accommodate the worst expected transient misalignment of rotor and casing without damage to the seal ring teeth 14.

After the turbine has been accelerated to operating speed and partially loaded, the worst of thermal gradients, vibration and misalignment problems are normally ended. As load is increased, the fluid pressure increases proportionately around the rings in such fashion, as discussed later, to cause the springs to be compressed and the seal ring segments to move radially inward until restrained by contact at surface 17. The dimensions of the seal ring and surface 17 on the casing are selected to create the smallest clearance between the teeth 14 and the rotor surface determined to be practical for loaded, relatively steady state operation.

The seal ring 13 is shown in its high load, small clearance condition. The higher pressure side of the seal is identified at 18. This pressure persists in the annular spaces 24 and 15 as a result of an open communication created by one or more local openings 23a. The openings 23a may, for example, be made by local cutouts in the high pressure side of shoulder 12a. The low pressure condition 19 persists also in the annular space 25.

It can easily be recognized that the resultant axial force of these pressures will cause the seal ring to be pushed toward the low pressure area 19 so as to create a leak resistant seal at location 22 between the seal ring 13 and the casing 12. For a geometry of known dimensions and pressures, the magnitude of this axial force can easily be calculated; also the radial force at 16 that would be required to overcome metal to metal friction in order to move the seal ring in a radial direction.

In a similar fashion, but somewhat more complicated, the radial forces can also be determined. With the exception of the pressure distribution along the seal ring inner surface (that facing the rotor), all other pressures were identified in the two paragraphs above. There will be a pressure drop across each tooth of the seal. Using the known condition of flow continuity through each tooth, with constant enthalpy expansions, a relatively accurate distribution of pressure can be calculated using a trial and error process for the series of constant area throttlings. On some packing rings a high mach number will exist to complicate the calculation, but this will be known and accounted for by those skilled in the art.

The radial pressure distribution is used to select the dimensions of the seal ring to achieve an appropriate resultant inward force on the seal ring. The design goal is to establish, for the seal ring a force condition that will cause the ring to overcome its weight, spring and friction forces so as to shift it in its inward or small clearance position for the pressure conditions which can be predicted to exist when the turbine is operating at a small but significant load such as 25 to 35%.

Figure 3:
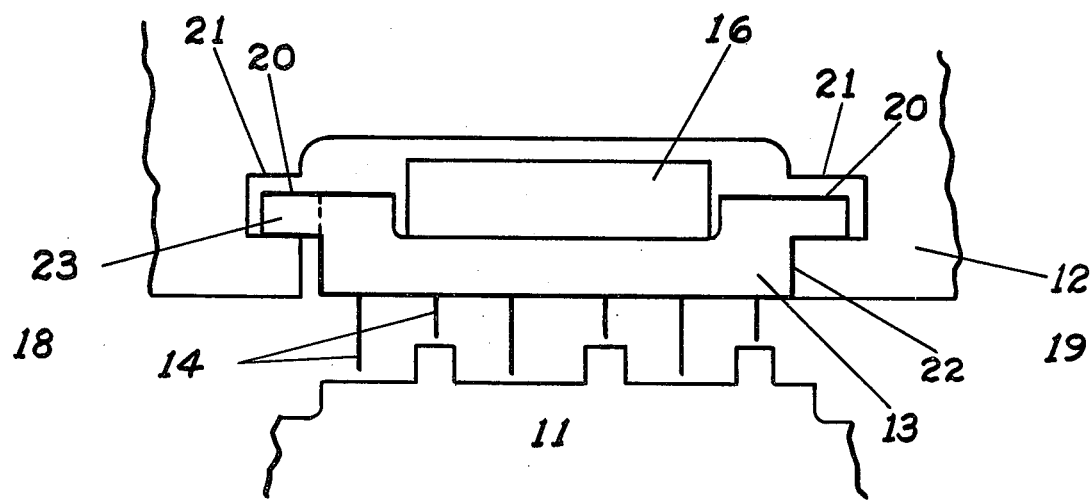
FIG. 3 is a horizontal elevation drawing, partly in section, showing an alternative seal ring arrangement to that illustrated in FIG. 1.

For turbine locations with relatively small pressure conditions it will be recognized quickly by those familiar with the art that the seal rings should be made lighter in weight and employ springs with weaker spring constants. It should be especially noted that the geometry of the seal rings can be altered to adjust the magnitude of the resultant inward force caused by pressure. This is done by changing the portion of the outer periphery of the seal ring that is exposed to the high pressure. FIG. 3 is representative of a seal ring with a large portion of the seal ring outer surface exposed to the high pressure, while FIG. 1 illustrates a ring where a smaller proportion of seal ring outer surface is acted on by the high pressure fluid. FIG. 3 also illustrates a seal ring with lesser weight.

As will be recognized by those familiar with elastic fluid turbines, the internal pressure at most locations throughout the turbine is approximately proportional to load. As load and mass flow is increased, local pressures increase in approximately linear fashion. Under these circumstances, the pressure drop across turbine stages and most turbine seal rings also increase in a predictable and linear fashion with increasing load and fluid flow. It is this relationship that can allow a designer to select a condition of load and pressure for each seal ring where the pressure forces can be expected to overcome the combination of spring force, weight, and friction so as to move the seal ring to its small clearance condition.

As discussed above, the designer can partially control this circumstance by varying the dimensions, weight and spring constants employed within the seal ring.

A considerable variety of springs 16 can be employed. They must be selected to have long life and stable characteristics while exposed to high temperature, vibration and possible corrosive conditions. S-shaped springs are illustrated, but flat springs and others can be employed.

It will be noted that the springs see different requirements depending on circumferential position. In FIG. 2, it can be noted that for the four segment seal ring illustrated, there are six springs required, one each at locations 28, 29, 30, 31, 32 and 33.

Locations 28 and 30 require a spring that must be capable of pushing the segment to its maximum radial position while supporting the weight of the seal ring segment and resisting a selected magnitude of pressure forces.

Locations 31 and 33 have no weight to support. They must be designed to resist a selected amount of force caused by the pressure distribution on one segment less the small downward weight component which tends to open the clearance at these locations.

Location 29 must have a spring designed to resist the selected pressure distribution force from the two opposed ring segments in addition to the small weight-caused component of force which tends to decrease radial clearance at that location.

Location 32 must be designed to resist the selected level of pressure distribution forces on the two opposing segments less the downward component of force caused by the weight of the segments which tend to cause a large clearance condition.

Figure 4:
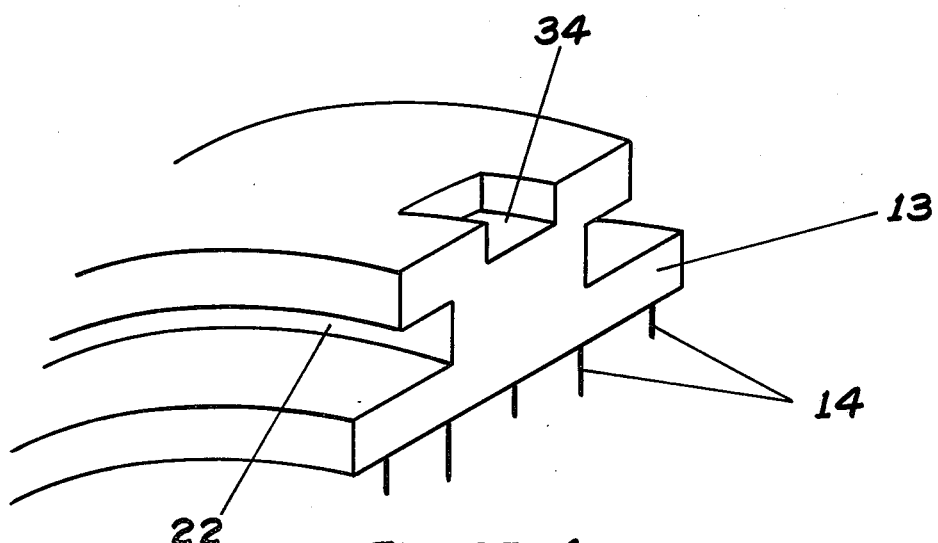
FIG. 4 is an isometric view of a portion of the seal ring.

The springs should be physically sized and contained by surrounding parts to make escape difficult, even if broken. It will be noted on FIG. 4 that a pocket, 34, for the springs can be obtained by removing a portion of the outermost periphery of either or both of the adjacent seal rings. The removal must not interfere with the seal surface, 22. Greater assurance of correct positioning and containment of a spring can be obtained by attaching it to the pocket 34 of the seal ring, in a proper position to be in proper alignment with the adjacent seal ring or the locking piece 26.

It might be noted that one spring at each horizontal joint could be considered instead of the two that are illustrated. This complicates assembly and may reduce the ability to contain the springs during operation. It may further restrict the ability to determine with reasonable accuracy under what condition the seal rings will shift position, since a common spring cannot simultaneously accomplish the somewhat different spring force needs that would be ideal for the segments above and below the horizontal joint.

The gap between seal ring segments must be carefully selected. This choice is made to properly reflect thermal expansion of the seal ring relative to that of the casing or diaphragm in which it is held. Both temperature and thermal coefficient of expansion must be considered for each component.

Various other modifications of the invention may occur to those skilled and it is desired to secure, by the appended claims, all such modifications as fall within the true spirit and scope of the invention.

What I claim as new and desire to secure by Letters Patent of the United States is:

1. In an elastic fluid turbine employing seals to minimize leakage between rotating and stationary components, an improvement in the seal arrangement utilizing the combination of:

a segmented seal ring supported by and at least partially contained in an annular groove formed in a stationary casing to permit motion of said seal ring between a large diameter position and a small diameter position corresponding respectively to large and small clearance of said seal ring with regard to the rotating shaft, said seal ring groove being partially defined by a pair of opposing, spaced apart shoulders on said casing which form an opening of said groove extending radially into the clearance area between said casing and said rotating shaft;

each segment of said seal ring including an inner arcuate portion hving seal teeth extending therefrom in the direction of and adjacent to said rotating shaft, a radially outwardly facing arcuate surface on said seal ring segment which is located opposite to a radially inward facing arcuate surface of said casing for limiting said large clearance position by contact between said opposing surfaces, an outer ring portion disposed within said seal ring groove for both axial and radial movement therein and having a pair of shoulders, extending axially in opposite directions for making radial contact respectively with said pair of spaced apart shoulders on said casing and thereby limiting said small clearance position, and a neck portion connected between said inner arcuate portion and said outer ring portion and extending between said casing shoulders, said neck portion having an axial thickness which is less than the distance between said opposing casing shoulders to thereby axially locate said seal ring segment against one of said casing shoulders and provide a contact pressure seal at the said of said neck portion which is subject to lower turbine fluid pressure; and a radial positioning means comprising a compressed spring means biased against said ring segments to forcibly cause said segments to move to said large clearance position, while working fluid which is freely admitted to the annular space between said casing and said ring segments will urge said segments toward said small clearance position, whereby at low speed and small turbine loads the spring forces will predominate, while at high flows and high working fluid pressure the pressure forces will predominate.

2. A fluid turbine seal arrangement as recited in claim 1, wherein said spring means include a flat spring interposed between said casing shoulders and an inner surface of said outer ring portion of said ring segment.

3. A fluid turbine seal arrangement as recited in claim 1, wherein said spring means include locking means on said casing for retaining said spring means in position between said casing and said ring segments.

4. A fluid turbine seal arrangement as recited in claim 1, wherein said spring means include a compressed spring interposed between the ends of said ring segments to bias said ring segments to move to said large clearance position.

5. A fluid turbine seal arrangement as recited in claim 1, wherein said inner arcuate portion of said seal ring segment comprises an inner ring portion connected at one side to said neck portion and includes said radially outward facing arcuate surface for limiting said large clearance position by said contact with said casing surface, said inner ring portion having said seal teeth extending therefrom.

6. A fluid turbine seal arrangement as recited in claim 5, wherein said inner ring portion extends substantially from said neck portion axially in both directions such that said inner ring portion is substantially wider than said neck portion and has said seal teeth extending therefrom radially into said clearance area.

7. A fluid turbine seal arrangement as recited in claim 6, wherein said radially outwardly facing arcuate surface in said seal ring segment which is located opposite to a radially inward facing arcuate surface of said casing comprises the radially outward facing surfaces of said inner ring portion.

* * * * *

UNITED STATES PATENT AND TRADEMARK OFFICE
CERTIFICATE OF CORRECTION

PATENT NO. : 4,436,311
DATED : March 13, 1984
INVENTOR(S) : Ronald E. Brandon

It is certified that error appears in the above—identified patent and that said Letters Patent is hereby corrected as shown below:

Claim 1, Column 6 line 7 delete "of said"

Signed and Sealed this

Twenty-eighth Day of August, 1990

Attest:

HARRY F. MANBECK, JR.

*Attesting Officer*  *Commissioner of Patents and Trademarks*